(12) United States Patent
Asadi et al.

(10) Patent No.: US 11,967,723 B2
(45) Date of Patent: Apr. 23, 2024

(54) SOLID-STATE ELECTROLYTE FOR LITHIUM AIR BATTERIES

(71) Applicants: Mohammad Asadi, Chicago, IL (US); Alireza Kondori, Chicago, IL (US); Mohammadreza Esmaeilirad, Chicago, IL (US)

(72) Inventors: Mohammad Asadi, Chicago, IL (US); Alireza Kondori, Chicago, IL (US); Mohammadreza Esmaeilirad, Chicago, IL (US)

(73) Assignee: ILLINOIS INSTITUTE OF TECHNOLOGY, Chicago, IL (US)

( * ) Notice: Subject to any disclaimer, the term of this patent is extended or adjusted under 35 U.S.C. 154(b) by 0 days.

(21) Appl. No.: 17/550,537

(22) Filed: Dec. 14, 2021

(65) Prior Publication Data

US 2022/0190350 A1 Jun. 16, 2022

Related U.S. Application Data

(60) Provisional application No. 63/125,026, filed on Dec. 14, 2020.

(51) Int. Cl.
*H01M 4/86* (2006.01)
*H01M 4/88* (2006.01)
*H01M 12/08* (2006.01)

(52) U.S. Cl.
CPC ....... *H01M 4/8663* (2013.01); *H01M 4/8807* (2013.01); *H01M 12/08* (2013.01); *H01M 2004/8689* (2013.01); *H01M 2300/0082* (2013.01)

(58) Field of Classification Search
CPC .................................................. H01M 4/8663
See application file for complete search history.

(56) References Cited

U.S. PATENT DOCUMENTS

| | | | |
|---|---|---|---|
| 2020/0350587 A1* | 11/2020 | Takenouchi | H01M 4/1399 |
| 2021/0013566 A1 | 1/2021 | Asadi et al. | |
| 2021/0091387 A1* | 3/2021 | Choi | H01M 4/8807 |
| 2021/0115572 A1 | 4/2021 | Asadi et al. | |
| 2022/0109156 A1* | 4/2022 | Xiao | H01M 4/525 |
| 2022/0140389 A1* | 5/2022 | Liu | H01M 10/056 429/492 |
| 2022/0154354 A1 | 5/2022 | Asadi et al. | |
| 2022/0278356 A1* | 9/2022 | Iizuka | H01M 10/056 |

FOREIGN PATENT DOCUMENTS

CN 110380114 A * 10/2019 ........ H01M 10/0525

OTHER PUBLICATIONS

CN110380114A translation (Year: 2023).*

* cited by examiner

*Primary Examiner* — Brian R Ohara
(74) *Attorney, Agent, or Firm* — Pauley Erickson & Swanson

(57) ABSTRACT

A solid-state electrolyte composition for a lithium battery. The composition includes a polymeric matrix material, inorganic nanoparticles dispersed in or chemically bonded with the polymeric matrix material, and a lithium salt. The nanoparticles are formed of a compound including lithium and a different semi-metal element or metal element. Exemplary inorganic nanoparticles include a Li-rich super ionic conductor having a $Li_xM_yP_zS_q$ structural formula, wherein M refers to the different semi-metal element or a metal element.

13 Claims, 2 Drawing Sheets

SOLID-STATE ELECTROLYTE FOR LITHIUM AIR BATTERIES

CROSS REFERENCE TO RELATED APPLICATION

This application claims the benefit of U.S. Provisional Patent Application Ser. No. 63/125,026, filed on 14 Dec. 2020. The co-pending provisional application is hereby incorporated by reference herein in its entirety and is made a part hereof, including but not limited to those portions which specifically appear hereinafter.

FIELD OF THE INVENTION

This invention relates generally to all solid-state lithium batteries and, more particularly to compositions of a solid-state electrolyte and manufacturing methods thereof.

BACKGROUND OF THE INVENTION

Recent scientific advances and technological innovations have driven the rapid development of sustainable energy technologies. In this regard, lithium-air batteries are deemed as one of the most promising next generation of clean energy storage devices owing to their high theoretical energy density (3505 Wh/kg) and can offer up to 8 times higher energy density compared to current lithium-ion batteries, making them potential candidates for long-range electric vehicles and grid systems. However, the real activity improvement of lithium-air batteries is hindered by their limited cycle life, low energy efficiency, and more importantly safety issues associated with lithium metal. In detail, the lithium metal reacts with the components of commonly used liquid electrolytes as well as the components present in ambient air such as carbon dioxide and moisture which lead to formation of dendrites and unstable solid electrolyte interphase (SEI) layers. This will ultimately lead to battery failure caused by short circuit and more importantly causes severe safety issues such as explosion. Moreover, the flammability and volatility of liquid electrolytes itself remains challenging for practical realization of this technology. In this regard, significant electrolyte advancements are needed to develop a commercial implementation.

To date, many attempts have been made to promote the stability of the lithium metal anode and increasing the cycle life of lithium batteries such as lithium protection layers, organic and inorganic solid state electrolytes, gel polymer electrolytes, etc. However, none were able to meet the performance requirements of a commercially viable lithium-air battery technology due to their low performance, e.g., low ionic conductivities, weak mechanical strength, poor chemical and electrochemical stability, high costs, etc. Therefore, designing and developing a solid-state electrolyte to replace the liquid electrolytes with outstanding electrochemical performance and mechanical strength offers a promising approach in commercialization of lithium-air battery technology.

SUMMARY OF THE INVENTION

The present invention provides a solid-state electrolyte (SSE) composition for a lithium battery and more specifically, for a lithium-air battery. The invention also includes an all solid-state lithium battery including the solid-state electrolyte composition, and the method for producing the electrolyte composition and lithium battery.

The invention includes a solid-state electrolyte composition for a lithium battery with a polymeric matrix material and inorganic nanoparticles dispersed in the polymeric matrix material. The nanoparticles are desirably formed of a compound including lithium and a different semi-metal element or metal element. The electrolyte composition can further include a lithium salt. The nanoparticles can also be chemically bonded within the matrix.

The polymeric matrix material is desirably a film forming polymer, such as, without limitation, polyethylene glycol (PEG), polyethylene oxide (PEO), polyethylene (PE), polystyrene-butadiene (SBR), and combinations thereof. The different semi-metal element or metal element is desirably selected from silicon (Si), germanium (Ge), arsenic (As), Antimony (Sb), tellurium (Te), molybdenum (Mo), tungsten (W), niobium (Nb), vanadium (V), copper (Cu), and combinations thereof. Exemplary lithium salts include bis(trifluoromethane)sulfonimide lithium salt (LiTFSI), lithium bis(fluorosulfonyl)amide (LiFSI), lithiumtrifluoromethanesulfonate (LiTF), lithium hexafluorophosphate (LiPF$_6$), and combinations thereof.

In embodiments of this invention, a combination of two or more polymer materials is used. For example, a combination of PEO, having a beneficial molecular weight, and PEG can be used. Among other benefits, the inclusion of PEG can provide more —OH binding sites for the nanoparticles.

In other embodiments of this invention, a coupling agent is used to bond the nanoparticles to the polymer matrix. An exemplary coupling agent is a silane coupling agent.

The invention further includes a cathode for a lithium battery including a gas diffusion layer, preferably with a catalyst coating, and the solid-state electrolyte composition applied on the gas diffusion layer. The solid-state electrolyte composition can be applied on to the gas diffusion layer of the electrode though a solution casting method with a desired thickness, in one or more applied layers.

Embodiments of the invention also provide an all solid-state lithium battery comprising an anode, a cathode, and the solid-state electrolyte composition, preferably between the anode and cathode. One example of the applicable lithium battery is lithium-air battery.

Embodiments of the invention include a method for producing the solid-state electrolyte composition and electrodes that include the electrolyte composition. The method includes: dissolving a polymer material in an organic solvent; dispersing the inorganic nanoparticles in the organic solvent; dissolving the lithium salt in the organic solvent to obtain an electrolyte solution; and applying the electrolyte solution to an electrode surface. The applied solution is then dried/cured on the surface.

The invention further includes a solid-state electrolyte composition for a lithium battery including a polymeric matrix material including a combination of polyethylene oxide (PEO) and polyethylene glycol (PEG). Inorganic nanoparticles are dispersed within the polymeric matrix material, the nanoparticles formed of a compound including lithium and a different semi-metal element or metal element. A silane coupling agent bond the nanoparticles to the polymer matrix material. A lithium salt is also dispersed within the polymeric matrix material.

In an exemplary case the solid-state electrolyte composition can be prepared by dissolving PEG and PEO polymers together or separately in an organic solvent such as acetonitrile, tetrahydrofuran, dimethylformamide, etc. The polymer to solvent ratio can vary between 0.1:99.9 to 99.9:0.1 w/w. A final molar ratio of [polymer repeating units]:[Li] of 0.1:9.9 to 9.9:0.1 is possible, and desirably 1:8 to 1:32, with 1-100% w/w LGPS to total weight of the polymer. These ratios can be tuned for the higher ionic conductivity and improved mechanical strength. The final electrolyte solution can be applied on, such as through a solution casting method, a catalyst coated gas diffusion layer (GDL) having and used as the cathode in the lithium-air battery. Desirable coating thickness includes an average thickness of 1-1000 nm.

Other features, aspects, and advantages of the invention will become apparent from the description, the drawings, and the claims. It is to be understood that all changes that come within the spirit of the invention are desired to be protected and thus the invention is not to be construed as limited by these examples.

DETAILED DESCRIPTION OF THE INVENTION

The invention provides and/or incorporates a solid-state electrolyte composition for a lithium battery, and specifically, the use of such composition in a lithium air battery. The invention includes the method of producing said composition and making an all solid-state lithium battery.

Figure 1:
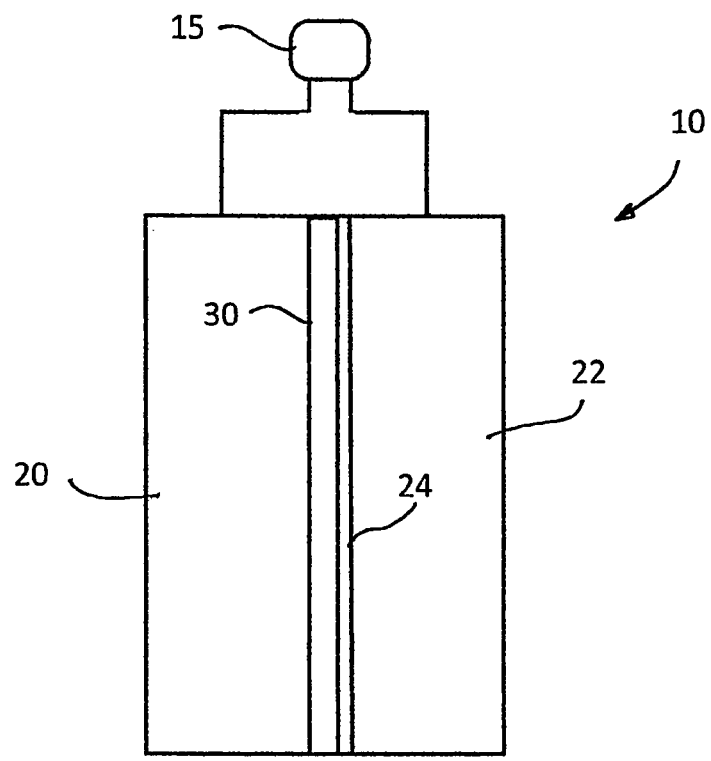
FIG. 1 shows a representative battery cell, according to one embodiment of this invention.

FIG. 1 shows a representative electrolytic cell 10, such as for use in a battery to provide power to load 15. The cell 10 includes an anode 20 and a cathode 22. The anode 20 is generally a lithium anode and the cathode 22 can be a carbon material. The cathode 22 is desirable an air permeable gas diffusion layer including a catalyst coating 24. The catalyst can be any suitable catalyst, applied as needed, such as shown or otherwise coating or impregnating portions of the gas diffusion layer. FIG. 1 additionally shows a solid-state electrolyte 30 according to this invention, between the anode 20 and the cathode 22.

The solid-state electrolyte of this invention is desirably fully solid, such that there is no liquid or gel component. In embodiments of this invention, the solid-state electrolyte composition includes a polymer material, an inorganic nanoparticle, and a lithium salt. The polymer material forms a matrix for supporting the active parts of the electrolyte. The polymer material is desirably a film forming material that can be applied as a liquid and solidifies on a surface when dried. Exemplary polymer materials for use in this invention include, without limitation, polyethylene glycol (PEG), polyethylene oxide (PEO), polyethylene (PE), polystyrene-butadiene (SBR), and combinations thereof.

In embodiments of this invention, the inorganic nanoparticles desirably are or include a lithium-rich super ionic conductor. Exemplary nanoparticles have a $Li_xM_yP_zS_q$ structural formula, where each of x, y, z, and q is an integer and M refers to either a semi-metal element such as silicon (Si), germanium (Ge), arsenic (As), antimony (Sb), tellurium (Te) or a metal element such as molybdenum (Mo), tungsten (W), niobium (Nb), vanadium (V), copper (Cu), etc. In presently preferred embodiments, x is 10, y is 1, z is 2, and q is 12. Exemplary inorganic nanoparticles include, without limitation, LGPS ($Li_{10}GeP_2S_{12}$), LWPS ($Li_{10}WP_2S_{12}$), LMoPS ($Li_{10}MoP_2S_{12}$), and combinations thereof.

Inclusion of a lithium salt provides benefits such as, without limitation, making the electrolyte ionically conductive, and providing the electrolyte with enough lithium ions for transfer during battery charge and discharge. The lithium salt also can lower the degree of crystallinity of the polymer matrix and increase the amorphicity, which improves the ionic conductivity. The lithium salt is not chemically bound to any other compound, but is dissociated inside the matrix. Exemplary lithium salts include, without limitation, bis(trifluoromethane)sulfonimide lithium salt (LiTFSI), lithiumtrifluoromethanesulfonate (LiTFS), lithium hexafluorophosphate ($LiPF_6$), and combinations thereof.

In embodiments of this invention, a combination of two or more polymer materials is used. In some embodiments, PEO is a preferred base polymer due to its molecular weight. A combination of PEO and PEG can be used. PEO can have a molecular weight (Mw) between 600 k and 2000 k, whereas PEG is a short-chain version and has a Mw about ~2000. Adding PEG in combination provides several benefits, such as: (i) the PEG material provides more —OH groups to facilitate the chemical bonding (using a silane coupling agent) used to bind the nanoparticles (such as $Li_{10}GeP_2S_{12}$); (ii) PEG has a similar structure to that of PEO, therefore it does not cause any phase segregation issue; and (iii) in certain molecular weight ranges, PEG provides faster Li+ ion transport and higher Li+ transference number.

In embodiments of this invention, such as the PEO/PEG mixture discussed above, a coupling agent is used to bond the nanoparticles to the polymer matrix. An exemplary coupling agent is a silane coupling agent. The bonding occurs via chemical bonding of sulfur atoms in $Li_2S$ clusters of the nanoparticles and the Si atoms in the silane coupling agent. This helps alleviate the interfacial instability of the nanoparticles in contact with both the lithium metal anode and the air due to the similarity between O—H and S—Li bonds. In embodiments of this invention, the silane coupling agent has a general formula of R—Si-$(OCH_3)_3$ where R is a hydrocarbon chain or alkyl halide hydrocarbon, where the halide can be chlorine, bromine, fluoride, and/or iodine elements. Exemplary coupling agents include 2-[Methoxy (polyethyleneoxy)6-9 propyl]trimethoxysilane, chloropropyl trimethoxy silane, and similar compounds.

The solid-state electrolyte composition of this invention can be prepared by dissolving polymers in an organic solvent, such as acetonitrile, tetrahydrofuran, dimethylformamide, etc. The polymer to solvent ratio can vary between 0.1:99.9 to 99.9:0.1 w/w. The inorganic nanoparticles (e.g., LGPS) can be dispersed in the same solvent as for the polymeric part. The lithium salt (e.g., LiTFSI) can also be dissolved in the same solvent as for the polymeric part with salt to solvent weight ratio of 0.1:99.9 to 99.9:0.1. Once all solutions are prepared, they are added together. The final solution can then be applied on the intended surface(s), such as a catalyst coated gas diffusion layer (GDL) to form a cathode-electrolyte structure for a lithium-air battery. Any suitable application method can be used, such as a solution casting method. Desirably the final solid coating has an average thickness of 1-1000 nm. In embodiments of this invention the electrolyte has a final polymer to lithium molar ratio of 0.1:9.9 to 9.9:0.1, with 1-100% w/w LGPS to total weight of the polymer. More desirably, the molar ratio of the polymer repeating units to lithium, such as [EO]:[Li] for PEO, is 1:8-1:32. These ratios can be tuned for higher ionic conductivity and/or improved mechanical strength.

The present invention is described in further detail in connection with the following examples which illustrate or simulate various aspects involved in the practice of the invention. It is to be understood that all changes that come within the spirit of the invention are desired to be protected and thus the invention is not to be construed as limited by these examples.

An exemplary SSE was prepared by dissolving PEG and PEO polymers in an organic solvent, such as acetonitrile, tetrahydrofuran, dimethylformamide, etc. Inorganic LGPS nanoparticles were separately dispersed using the same solvent as for the polymeric part. The lithium salt LiTFSI was also dissolved using the identical solvent. Once all solutions were prepared, they were added together. The final solution was then be applied on the intended surfaces. A GDL-SSE architecture was used with a lithium metal anode in a custom-designed lithium-air battery for electrochemical testing purposes. For ionic conductivity measurements and mechanical strength tests, the solution was casted on a stainless-steel disc and a glass watch, respectively.

Figure 2:
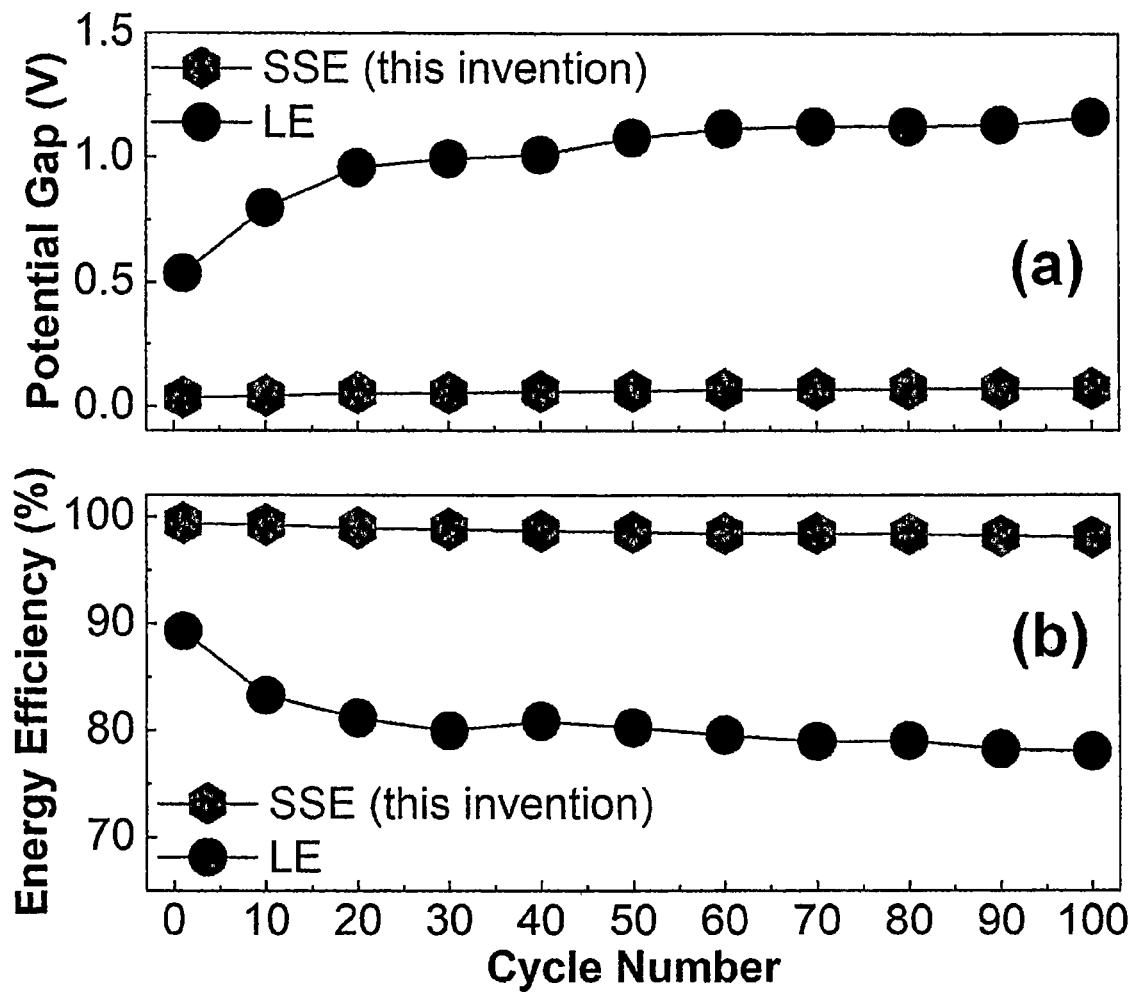
FIG. 2 shows a comparison of (a) potential gap and (b) energy efficiency for an example SSE of this invention and a control comparison non-aqueous liquid electrolyte lithium-air battery systems. Hexagons represent the performance of the SSE system and circles show the performance of the control liquid electrolyte system.

FIG. 2 shows a performance of the SSE lithium-air battery (hexagons) compared to a control non-aqueous liquid electrolyte counterpart with the same catalyst coating on the cathode part (circles) and the same current density and capacity of 1000 mA/g and 1000 mAh/g. As it can be seen in FIG. 2, the potential gap in the SSE lithium-air battery system is 34.5 mV at the first cycle that is stable over 100 cycles (68.5 mV at the 100th cycle). The observed potential gap in the SSE lithium-air battery system (34.5 mV) was more than 15 times smaller than that of the non-aqueous liquid electrolyte lithium-air battery (533.2 mV) at the first cycle, confirming the superiority of the SSE. Similarly, the energy efficiency of the SSE lithium-air battery system was 99.42% at the first cycle and stable over 100 cycles (98% at the 100th cycle) whereas the energy efficiency for the non-aqueous liquid electrolyte lithium-air battery system is 89.27% at the first cycle that decays to 78% over 100 cycles, suggesting the better performance of the SSE compared to non-aqueous liquid electrolyte medium.

Thus, the invention provides an improved solid-state electrolyte composition for a lithium battery. The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. A solid-state electrolyte composition for a lithium battery, comprising:
    a polymeric matrix material;
    inorganic nanoparticles dispersed within the polymeric matrix material, the nanoparticles comprising a Li-rich super ionic conductor having a $Li_xM_yP_zS_q$ structural formula, wherein M refers to a metal element, and each of x, y, z, and q is an integer, wherein the metal element is selected from the group consisting of molybdenum (Mo), tungsten (W), niobium (Nb), vanadium (V), copper (Cu), and combinations thereof; and
    a lithium salt.

2. The composition of claim 1, wherein the polymeric matrix material comprises polyethylene glycol (PEG), polyethylene oxide (PEO), polyethylene (PE), polystyrene-butadiene (SBR), and combinations thereof.

3. The composition of claim 1, wherein said lithium salt comprises bis(trifluoromethane)sulfonimide lithium salt (LiTFSI), lithium bis(fluorosulfonyl)amide (LiFSI), Lithiumtrifluoromethanesulfonate (LiTF), lithium hexafluorophosphate ($LiPF_6$), and combinations thereof.

4. The composition of claim 1, wherein x is 10, y is 1, z is 2, and q is 12.

5. The composition of claim 1, wherein the inorganic nanoparticles comprise LWPS ($Li_{10}WP_2S_{12}$), LMoPS ($Li_{10}MoP_2S_{12}$), or combinations thereof.

6. The composition of claim 1, wherein the polymeric matrix material comprises polyethylene glycol (PEG), polyethylene oxide (PEO), polyethylene (PE), polystyrene-butadiene (SBR), and combinations thereof.

7. The composition of claim 1, wherein said lithium salt comprises bis(trifluoromethane)sulfonimide lithium salt (LiTFSI), lithium bis(fluorosulfonyl)amide (LiFSI), Lithiumtrifluoromethanesulfonate (LiTF), lithium hexafluorophosphate ($LiPF_6$), and combinations thereof.

8. The composition of claim 1, further comprising a coupling agent bonding the nanoparticles to the polymer matrix material.

9. The composition of claim 1, having 1-10% w/w nanoparticles to total weight of the polymeric matrix material.

10. The composition of claim 1, wherein the composition is fixed on a gas diffusion layer material.

11. A method for producing the solid-state electrolyte composition of claim 1, comprising steps of:
    dissolving a polymer material in an organic solvent;
    dispersing the inorganic nanoparticles in the organic solvent;
    dissolving the lithium salt in the organic solvent to obtain an electrolyte solution; and
    applying the electrolyte solution to an electrode surface.

12. The method of claim 11, wherein the polymer material, inorganic nanoparticles, and lithium salt are formed in separate solutions using the organic solvent, and then the separate solutions combined to obtain the electrolyte solution.

13. A cathode-electrolyte structure for a lithium battery, comprising:
    a gas diffusion layer including a catalyst coating;
    a polymeric matrix material disposed against the catalyst coating of the gas diffusion layer, the polymeric matrix material including a combination of polyethylene oxide (PEO) and polyethylene glycol (PEG);
    inorganic nanoparticles dispersed within the polymeric matrix material, the nanoparticles comprising a Li-rich super ionic conductor having a $Li_xM_yP_zS_q$ structural formula, wherein M refers to a metal element, and each of x, y, z, and q is an integer, wherein the metal element is selected from the group consisting of molybdenum (Mo), tungsten (W), niobium (Nb), vanadium (V), copper (Cu), and combinations thereof;
    a silane coupling agent bonding the nanoparticles to the polymer matrix material; and
    a lithium salt dispersed within the polymeric matrix material.

\* \* \* \* \*